United States Patent [19]
Shetterly et al.

[11] Patent Number: 5,385,786
[45] Date of Patent: Jan. 31, 1995

[54] APPARATUS AND METHOD FOR CONTROLLING STRESSES IN LAMINATED AUTOMOTIVE GLASS

[75] Inventors: Donivan M. Shetterly, Toledo; James P. Schnabel, Jr., Maumee, both of Ohio

[73] Assignee: Glasstech, Inc., Perrysburg, Ohio

[21] Appl. No.: 16,162

[22] Filed: Feb. 9, 1993

[51] Int. Cl.[6] .................................. B32B 9/00
[52] U.S. Cl. ......................... 428/432; 428/81;
428/192; 428/241; 428/246; 428/266; 428/273;
428/285; 428/902; 65/114; 65/115; 156/155;
156/296
[58] Field of Search ............... 428/273, 192, 432, 426,
428/266, 245, 241, 285, 224, 902, 81; 65/114,
115; 156/155, 296

[56] References Cited

U.S. PATENT DOCUMENTS

| | | | |
|---|---|---|---|
| 3,741,743 | 6/1973 | Seymour | 65/287 |
| 4,400,194 | 8/1983 | Starr | 65/114 |
| 4,687,501 | 7/1987 | Reese | 65/103 |
| 4,826,522 | 5/1989 | d'Iribarne et al. | 65/115 |
| 5,069,703 | 12/1991 | d'Iribarne et al. | 65/104 |
| 5,093,177 | 3/1992 | Anderson et al. | 428/124 |
| 5,147,721 | 9/1992 | Baron et al. | 428/365 |
| 5,244,720 | 9/1993 | Leung et al. | 428/266 |

*Primary Examiner*—Patrick J. Ryan
*Assistant Examiner*—Abraham Bahta
*Attorney, Agent, or Firm*—Brooks & Kushman

[57] ABSTRACT

A glass sheet annealing ring includes an insulating ring juxtaposed the inboard periphery of the annealing ring for reducing the cooling rate of the glass sheet in proximity to the insulating ring thereby reducing the magnitude of net inner band tension while maintaining edge compression as the glass sheet is cooled.

14 Claims, 2 Drawing Sheets

APPARATUS AND METHOD FOR CONTROLLING STRESSES IN LAMINATED AUTOMOTIVE GLASS

TECHNICAL FIELD

This invention relates to an improved annealing ring for supporting a glass sheet during cooling and improved method of cooling the glass sheet.

BACKGROUND ART

Glass sheets which are press formed individually for making laminated backlites or windshields are cooled in such a manner as to control stresses. This cooling is accomplished either by natural convection or by low level forced air cooling. Such lites develop surface stresses which are comparable to those of actively annealed glass sheets from conventional, gravity sagged windshield processes.

However, the edge compression stress on press formed lites cooled by natural convection or low level forced cooling is generally higher than that for conventional, actively annealed lites. Edge compression is typically 300 to 400 Kg/cm$^2$ and 150 to 200 Kg/cm$^2$ for press formed lites cooled by natural convection or low level forced cooling and conventional actively annealed lites, respectively. This higher edge compression on the pressed formed lites represents an improvement in that said lites are less susceptible to edge breakage from handling.

Inboard from the edge compression, however, is a band of tension. The integrated inboard tension must equal the integrated edge compression. Therefore, the inboard tension is necessarily higher for individually pressed formed and cooled lites than for conventional gravity sagged lites. The measurable net inner band tension (NIBT) on press formed and cooled lites is typically 50 to 120 Kg/cm$^2$, where on conventional gravity sagged lites it is typically 25 to 50 Kg/cm$^2$.

Experience has shown that levels of net inner band tension in excess of about 60 Kg/cm$^2$ can result in performance problems (breakage) for windshield lites. Specifically, laminated windshields with inner band tension in excess of 60 Kg/cm$^2$ do not pass the so-called "scratch test" for windshields.

In the scratch test, the laminate (or individual lite) is abraded using 80 grit aluminum oxide sandpaper. The area typically abraded is a band about 6 inches wide immediately inside the perimeter of the glass. If cracking occurs within 24 hours of the abrasion, the sample is said to fail the scratch test. Experience has shown that samples with NIBT in excess of 60 Kg/cm$^2$ usually fail the test while those with less NIBT do not. The test is considered a good measure of the propensity of an installed windshield to crack from incidental abrasion or from stone impact.

Attempts have been made to reduce the magnitude of NIBT by reducing the rate of cooling of the glass sheet, especially inboard of where the glass sheet contacts a support ring.

Experience has also shown that edge compression of less than about of 150 to 200 Kg/cm$^2$ can result in breakage of laminated glass during installation of said glass into its opening, typically in an automobile. Higher edge compression will reduce the propensity of breakage during installation.

U.S. Pat. No. 5,069,703 discloses a covering for the tempering of glass sheets wherein a metallic fabric is used to cover a frame intended to support glass sheets being annealed. The metallic fabric is of low thermal conductivity and reduces the heat sink characteristics of a typical frame.

U.S. Pat. No. 4,687,501 discloses lightweight bending iron heat shields for glass bending molds that shade glass sheets from a heat source. The heat shields are utilized to change the heating rate of different areas of the glass sheets to effect the final shape of the glasses.

Typical glass sheets cooled by natural convection or low level forced cooling on conventional annealing rings have excess net inner band tension.

SUMMARY OF THE INVENTION

An object of the present invention is to provide an improved glass sheet annealing ring that modifies edge stresses obtained on a glass sheet which is press formed and then cooled.

Another object of the present invention is to provide an improved annealing ring that reduces net inner band tension on a press formed glass sheet cooled by natural convection or forced air.

A further object of the present invention is to provide an improved method of locally retarding the rate of cooling of a heated glass sheet about its edge in such a way that as the stresses are being made permanent in the glass sheet, the temperature of the glass sheet in proximity to its edge is maintained above its strain point so that the inner band stresses are distributed over a larger area.

Another objective of the present invention is to provide an improved method for maintaining the edge compression in a glass sheet developed by cooling with natural convection or low level forced cooling.

In carrying out the above objects and other objects of the invention, the improved glass sheet annealing ring constructed in accordance with the present invention includes an insulating ring juxtaposed the inboard periphery of the annealing ring. The insulating ring reduces the magnitude of net inner band tension, typically by 50% by retarding the rate of cooling of the peripheral portion of the glass sheet vis-a-vis its central portion.

Preferably, the insulating ring extends generally 7–13 cm inwardly of the forming and annealing ring. The insulating ring makes the inner band of tension or area of tension inboard of the peripheral portion of the glass sheet larger than that created on a conventional annealing ring.

The inner band of tension balances the edge compression in the glass sheet cooled on such a ring because the summation of these forces must be zero.

In one embodiment, the improved annealing ring also includes a support ring which is also mounted inboard and about the inboard periphery at the bottom of the annealing ring. The support ring extends inwardly of the annealing ring generally the same distance as the insulating ring. The support ring provides support for the insulating ring.

Preferably, the insulating ring is made from an insulating material. Such materials include glass fiber and ceramic resin felt materials.

The insulating ring is used to modify the edge stresses obtained on back lites and windshield lites which are press-formed and then cooled by increasing the area of inner band tension which thereby decreases the magnitude of inner band tension and the propensity of the glass sheet to break from impact.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
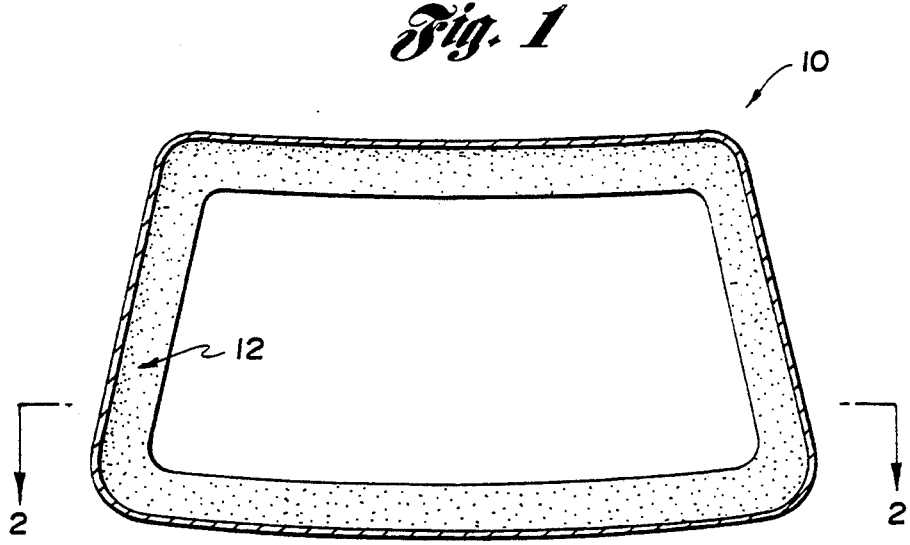
FIG. 1 is a plan view of an improved glass sheet annealing ring including an insulating ring constructed in accordance with the present invention.
Figure 2:
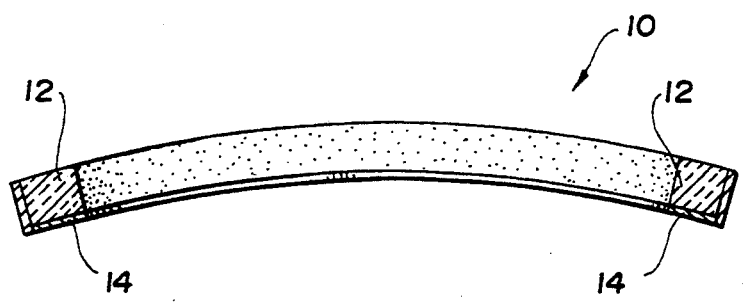
FIG. 2 is a sectional elevational view taken along lines 2—2 in FIG. 1 illustrating the insulating ring mounted on a support ring.

With reference to FIGS. 1 and 2 of the drawings, an improved glass sheet annealing ring is generally indicated by reference numeral 10. Annealing ring 10 reduces the magnitude of net inner band tension, or inner band tension value, while maintaining edge compression, or edge compression value of a formed glass sheet as it is cooled on the ring. As is hereinafter more fully described, the improved annealing ring 10 controls regional cooling and allows glass sheets used as laminated automobile lites to be annealed to meet specifications without using an annealer, thereby generating substantial cost savings.

As seen in FIGS. 1 and 2, the glass sheet annealing ring 10 includes an insulating ring 12 juxtaposed the inboard periphery of the annealing ring. Insulating ring 12 retards heat transfer from the portion of the glass sheet in proximity thereto to reduce the magnitude of net inner band tension by increasing the inboard area of forces that balance edge compression forces created during cooling. At the same time, insulating ring 12 maintains the edge compression created as the glass sheet is cooled. Because all the stresses over the entire glass sheet must average or integrate to zero, the magnitude of the inner band tension is a function of the area of the band. Preferably these forces integrate to 0 at a distance of at least 6 cm inwardly from the edge of the glass sheet. A preferred range for integration to 0 has been formed to be 7-16 cm inwardly from the edge of the glass sheet. Most preferably these forces integrate to 0 at about 11 cm.

Preferably, the insulating ring 12 extends generally 7-13 cm inches inwardly of the annealing ring to produce a wide band of reduced tension in the glass sheet while not substantially changing the edge compression of the glass sheet. Thereby, the magnitude of net inner band tension can be comparable to that found in conventionally annealed glass sheets used as windshields, while the edge compression is significantly greater. Inner band tension can also be, and preferably is, less than that found in conventionally annealed glass sheets, while the edge compression is significantly greater.

Preferably, the glass sheet annealing ring 10 also includes a support ring 14, made from thin gauge stainless steel material, mounted inboard and about the inboard periphery at the bottom of the annealing ring 10. The support ring 14 extends inwardly of the annealing ring generally the same distance as the insulating ring 12 and provides support for the insulating ring.

Preferably, the insulating ring comprises a glass fiber matrix material having very low thermal conductivity. Kaowool TM insulating material has been successfully used as insulating ring 12.

The insulating ring 12 retards the rate of cooling of the peripheral portion of the glass sheet in such a way that as the stresses are being made permanent as the glass sheet cools, the insulating ring 12 maintains the temperature of the glass, in proximity to it, above the strain point of the glass. Thereby, the stresses formed during cooling are distributed over a larger area than is the case when cooling occurs without the insulating ring 12.

An example which follows compares the average edge compression and the average inner band tension between control samples of glass sheets annealed without an insulating ring 12 and glass sheets annealed on an annealing ring 10 having an insulating ring and industry standards. These numerical results represent average values of 4 points on each of 3 glass sheets formed for use as laminated windshield lites. It can be appreciated that the values at each point are summed and averaged. The 4 points were located approximately 8 inches from the vertical center line on each side of the center line, top and bottom of the glass sheet. Industry Standards are measured values from traditional gravity sagged and actively annealed samples.

|  | Avg. Edge Compression (Kg/cm$^2$) | Avg. Inner Band Tension (Kg/cm$^2$) |
| --- | --- | --- |
| Industry Standards Samples | 150 | 30 |
| Control Samples | 413 | 64 |
| Insulating Ring Samples | 410 | 34 |

Figure 3:
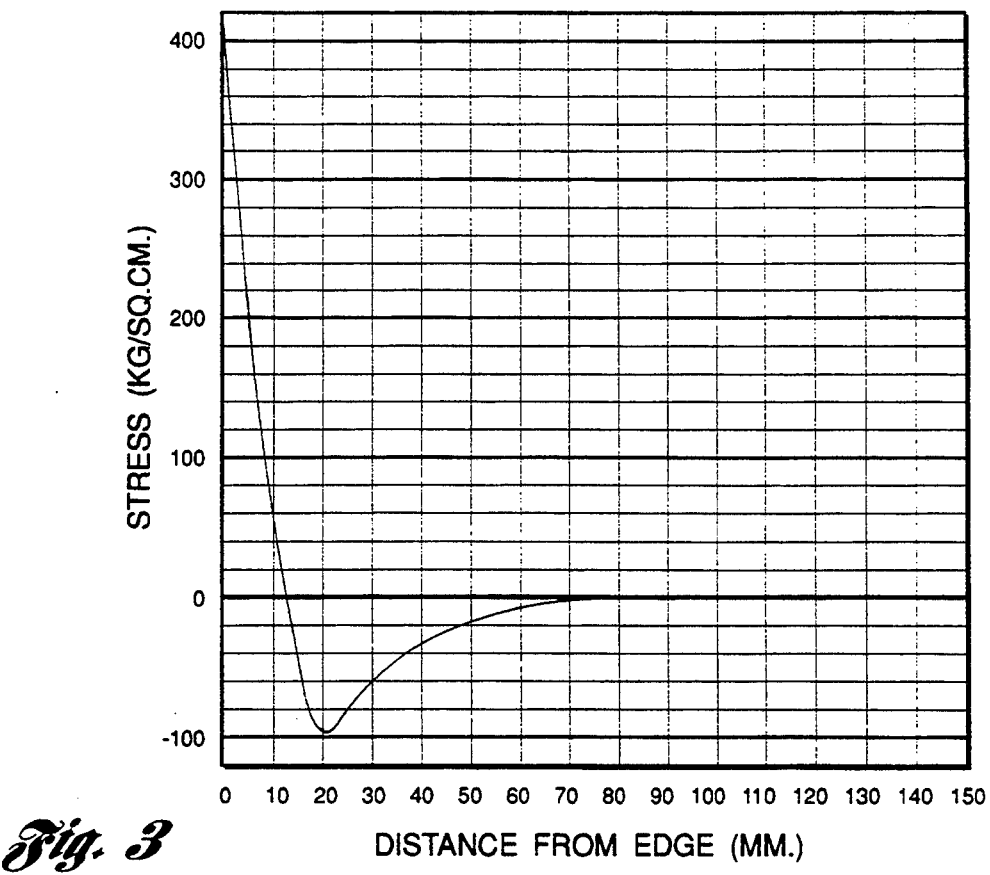
FIG. 3 is a graph illustrating a stress distribution in a glass sheet annealed on an annealing ring without the improvement of the present invention.
Figure 4:
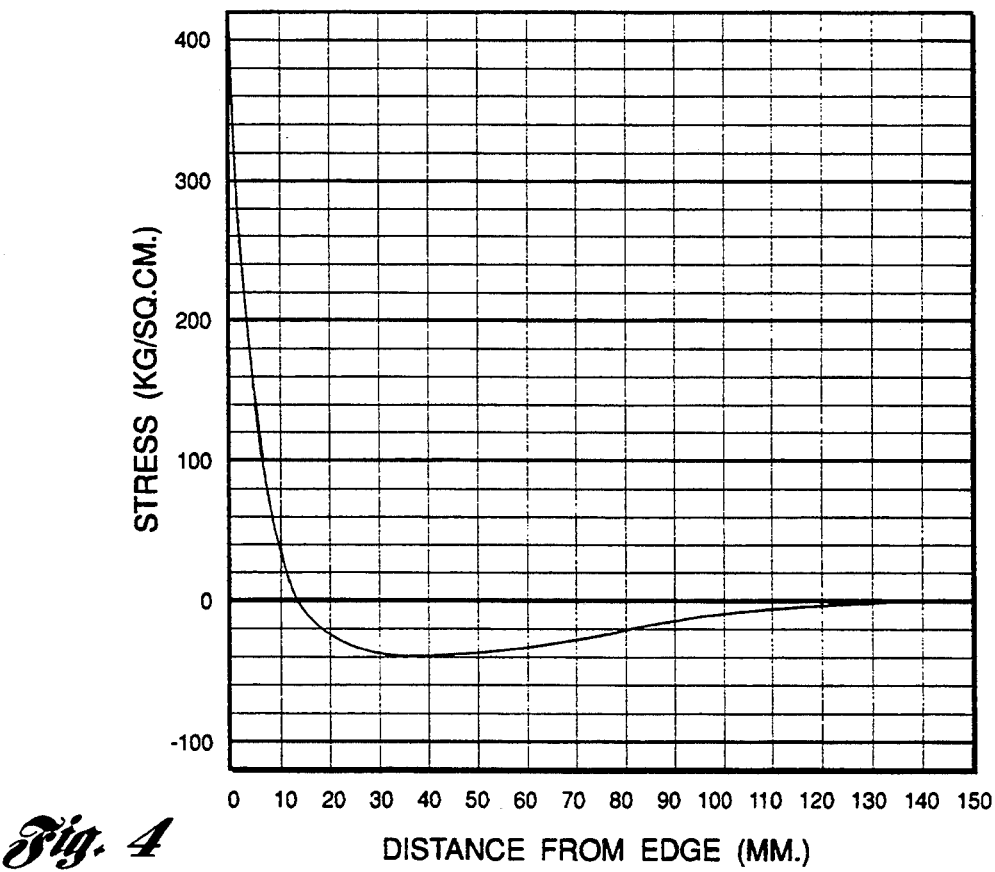
FIG. 4 is a graph representing a modified stress distribution in a glass sheet annealed on the annealing ring referred to in FIG. 3 including the improvement according to the invention wherein the maximum net inner band tension in the glass sheet has been reduced.

As illustrated through the example, use of such an insulating ring 12 has reduced inner band tension by 47% while maintaining edge compression when compared to the control samples. FIGS. 3 and 4 represent unmodified and modified stress distributions in glass sheets annealed without and with the hereinabove described insulating ring 12. FIG. 3 illustrates the unmodified stress distribution. FIG. 4 illustrates the modified stress distribution wherein the amplitude of the tensile stress which typically occurs 20 millimeters from the edge of an annealed glass sheet has been reduced in magnitude approximately 50% by the use of the insulating ring 12.

Such a reduction in the magnitude of inner band tension can also be accomplished in glass sheets which are gravity sag-formed on a perimeter ring and subsequently annealed. However, the edge compression is typically 200 Kg/cm$^2$ or less yielding a higher propensity to breakage during installation into the vehicle. The cooling rate in the active annealing portion of a gravity sag lehr is significantly lower than it is for natural convection or low level forced cooling. This reduced cooling rate is required to minimize warpage and breakage of the stacked glasses on the perimeter ring and to control net inner band tension. This lower cooling rate results in lower edge compression.

While the best mode for carrying out the invention has been described in detail, those familiar with the art to which this invention relates will recognize various alternative designs and embodiments for practicing the invention as defined by the following claims.

What is claimed is:

1. An improvement in a glass sheet annealing ring, the improvement comprising:
an insulating ring juxtaposed the inboard periphery of the annealing ring for reducing the cooling rate of the glass sheet in proximity to said insulating ring thereby reducing the magnitude of net inner band tension while maintaining edge compression as the glass sheet is cooled.

2. The improvement of claim 1 wherein said insulating ring extends generally 7–13 cm inwardly of the annealing ring thereby to increase the width of and proportionately lower the magnitude of net inner band tension in the glass sheet.

3. The improvement of claim 2 further including a support ring mounted inboard and about the inboard periphery at the bottom of the forming and annealing ring.

4. The improvement of claim 3 wherein said support ring extends inwardly of the annealing ring generally the same distance as said insulating ring and wherein the support ring provides support for the insulating ring.

5. The improvement of claim 4 wherein said insulating ring comprises a glass fiber matrix material.

6. The improvement of claim 5 wherein said support ring is made from thin gauge stainless steel material.

7. A glass sheet annealing ring for supporting a glass sheet during cooling characterized by an insulating ring juxtaposed the inboard periphery of the annealing ring, said insulating ring retarding the cooling of the glass sheet in proximity to said insulating ring thereby reducing the net magnitude of inner band tension while maintaining edge compression as the glass sheet is cooled.

8. A glass sheet suitable for lamination comprising an outer peripheral portion and an inner peripheral portion circumscribed by the outer peripheral portion; said outer peripheral portion having an edge compression with a maximum value at the edge of the glass sheet and diminishing inwardly of the glass sheet and said inner peripheral portion having a net tension value and also having a maximum tension value; said edge compression value and said net tension value integrating to 0 at a distance greater than 6 cm inwardly of the edge of the glass sheet.

9. A glass sheet as in claim 8 wherein said integration to 0 occurs between 7–16 cm inwardly of the edge of the glass sheet.

10. A glass sheet as in claim 9 wherein said integration occurs generally 11 cm inwardly of the edge of the glass sheet.

11. A glass sheet suitable for lamination comprising an outer peripheral portion and an inner peripheral portion circumscribed by the outer peripheral portion; said outer peripheral portion having an edge compression with a maximum value at the edge of the glass sheet and diminishing inwardly of the glass sheet; said inner peripheral portion having a net tension value and also having a maximum tension value; said edge compression value and said net tension value integrating to 0; and wherein a maximum value of edge compression is greater than 300 $Kg/cm^2$ and wherein said maximum tension value is less than 60 $Kg/cm^2$.

12. A glass sheet as in claim 11 wherein said maximum value of edge compression is greater than 400 $Kg/cm^2$ and wherein said maximum tension value is less than 60 $Kg/cm^2$.

13. A glass sheet as in claim 12 wherein said maximum value of edge compression is greater than 400 $Kg/cm^2$ and wherein said maximum tension value is less than 40 $Kg/cm^2$.

14. A glass sheet suitable for lamination comprising an outer peripheral portion and an inner peripheral portion circumscribed by the outer peripheral portion; said outer peripheral portion having an edge compression with a maximum value at the edge of the glass sheet of greater than 400 $Kg/cm^2$ and diminishing inwardly of the glass sheet and said inner peripheral portion having a net tension value and also having a maximum tension value of less than 60 $Kg/cm^2$; said edge compression value and said net tension value integrating to 0 at a distance greater than 6 cm inwardly of the edge of the glass sheet.

* * * * *